(12) United States Patent
Panhoelzl et al.

(10) Patent No.: US 11,125,639 B2
(45) Date of Patent: Sep. 21, 2021

(54) PRESSURE SENSOR FOR MEASURING A PRESSURE OF A FLUID AND METHOD FOR PRODUCING A PRESSURE SENSOR FOR MEASURING A PRESSURE OF A FLUID

(71) Applicant: Robert Bosch GmbH, Stuttgart (DE)

(72) Inventors: Bernhard Panhoelzl, Weinstadt (DE); Daniel Etter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/637,101

(22) PCT Filed: Jul. 19, 2018

(86) PCT No.: PCT/EP2018/069657
§ 371 (c)(1),
(2) Date: Feb. 6, 2020

(87) PCT Pub. No.: WO2019/029971
PCT Pub. Date: Feb. 14, 2019

(65) Prior Publication Data
US 2020/0249112 A1  Aug. 6, 2020

(30) Foreign Application Priority Data
Aug. 9, 2017  (DE) .................. 10 2017 213 863.7

(51) Int. Cl.
*G01L 19/00* (2006.01)
*G01L 19/14* (2006.01)
*H01R 13/24* (2006.01)

(52) U.S. Cl.
CPC ...... *G01L 19/0069* (2013.01); *G01L 19/0084* (2013.01); *G01L 19/144* (2013.01); *G01L 19/147* (2013.01); *G01L 19/148* (2013.01); *H01R 13/2421* (2013.01)

(58) Field of Classification Search
None
See application file for complete search history.

(56) References Cited

FOREIGN PATENT DOCUMENTS

| CN | 204718731 U | 10/2015 |
|---|---|---|
| CN | 206362481 U | 7/2017 |
| DE | 102014223653 A1 | 5/2016 |
| DE | 102015222115 A1 | 5/2017 |
| DE | 102015226115 A1 | 6/2017 |
| EP | 2985581 A1 | 2/2016 |
| EP | 3029443 A1 | 6/2016 |

OTHER PUBLICATIONS

International Search Report for PCT/EP2018/069657, dated Jan. 22, 2019.

*Primary Examiner* — Lisa M Caputo
*Assistant Examiner* — Nigel H Plumb
(74) *Attorney, Agent, or Firm* — Norton Rose Fulbright US LLP; Gerard Messina

(57) ABSTRACT

A pressure sensor for measuring a pressure of a fluid, the pressure sensor including: a sensor element for measuring the pressure of the fluid; a control and/or evaluation circuit for controlling and/or evaluating a measuring signal of the sensor element; a circuit carrier, the control and/or evaluation circuit being disposed on the circuit carrier; a carrier element, the circuit carrier being fastened on the carrier element; and a housing element, the carrier element together with the circuit carrier being fastened in the housing element in a form-locking and/or force-locking manner, wherein the carrier element is configured in one piece from an electrically non-conducting material.

6 Claims, 3 Drawing Sheets

PRESSURE SENSOR FOR MEASURING A PRESSURE OF A FLUID AND METHOD FOR PRODUCING A PRESSURE SENSOR FOR MEASURING A PRESSURE OF A FLUID

FIELD OF THE INVENTION

The present invention relates to a pressure sensor for measuring a pressure of a fluid and to a method for producing a pressure sensor for measuring a pressure of a fluid.

BACKGROUND INFORMATION

Various (high) pressure sensors are believed to be understood. Patent document DE 10 2015 226 115 A1 discusses a pressure sensor. The sensor comprises a control and/or evaluation circuit for controlling and/or evaluating a measuring signal of the sensor element. The control and or evaluation circuit is disposed on a circuit carrier, which in turn is fastened on a carrier element. The carrier element is configured in two parts, namely, an electrically conducting part and an electrically insulating part, the electrically conducting part being connected to ground.

The disadvantage here is that the carrier element is technically elaborate and the production of the carrier element is elaborate in particular due to the two-part structure of the carrier element. Furthermore, the electrically conductive part of the carrier element is always present, even if no connection of the control and/or evaluation circuit to ground is necessary. The pressure sensor consequently involves high production costs.

SUMMARY OF THE INVENTION

Specific embodiments of the present invention advantageously make it possible to indicate a pressure sensor that is configured in a technically simple manner and is able to be produced cost-effectively, or make it possible to produce a pressure sensor cost-effectively and in a technically simple manner.

According to a first aspect of the present invention, a pressure sensor is provided for measuring a pressure of a fluid, the pressure sensor comprising:—a sensor element for measuring the pressure of the fluid;—a control and/or evaluation circuit for controlling and/or evaluating a measuring signal of the sensor element;—a circuit carrier, the control and/or evaluation circuit being disposed on the circuit carrier;—a carrier element, the circuit carrier being fastened on the carrier element; and—a housing element, the carrier element together with the circuit carrier being fastened in the housing element in a form-locking and/or force-locking manner, wherein the carrier element is configured in one piece from an electrically non-conductive material.

It is advantageous in this respect that the pressure sensor is typically configured in a technically simple manner. Moreover, the pressure sensor normally may be produced cost-effectively. Furthermore, the pressure sensor may generally be configured to be compact, i.e., the pressure sensor may take up little volume or space.

According to a second aspect of the present invention, a method for producing a pressure sensor for measuring a pressure of a fluid is provided, the method comprising the following steps:—providing a pressure sensor base unit, the pressure sensor base unit comprising a housing element and a sensor element for measuring the pressure of the fluid;—providing a circuit carrier having a control and/or evaluation circuit for controlling and/or evaluating a measuring signal of the sensor element;—joining the circuit carrier to a carrier element formed in one piece from an electrically non-conducting material by form-locking connection and/or force-locking connection; and—inserting the carrier element together with the circuit carrier into the housing element and connecting the carrier element to the housing element.

It is advantageous in this respect that the pressure sensor is typically produced in a technically simple and cost-effective manner. The pressure sensor may generally be configured to be compact, i.e., the pressure sensor may take up little volume or space. In addition, no laborious positioning of the circuit carrier is normally required in relation to the housing element. This generally shortens the production time. Another advantage is that it is generally possible to establish or not to establish a connection between the control and/or evaluation circuit and ground when producing the pressure sensor. Thus it is typically possible to adapt the pressure sensor during production to the necessary requirements in a flexible manner.

The pressure sensor may be in particular a high pressure sensor for measuring or determining high pressures, e.g. in the range from approx. 10 bar to approx. 4000 bar.

Ideas regarding specific embodiments of the present invention may be regarded, inter alia, as being based on the thoughts and findings described below.

According to one specific embodiment, the control and/or evaluation circuit is disposed on two opposite sides of the circuit carrier. This makes it possible to design the pressure sensor typically to be particularly compact or space-saving.

According to one specific embodiment, the pressure sensor further comprises a grounding spring for connecting the control and/or evaluation circuit to ground. This makes it normally possible to establish a connection to ground in a technically simple manner. In addition, the position of the circuit carrier in the pressure sensor is typically defined in a technically simple manner.

According to one specific embodiment, the carrier element has a recess for accommodating the grounding spring. The grounding spring is thereby normally situated in a manner that is technically simple and secured against loss.

According to one specific embodiment, the pressure sensor further comprises at least one connecting spring for electrically connecting the control and/or evaluation circuit to further elements. One advantage of this is that the pressure sensor may typically be electrically connected to further elements in a technically simple and cost-effective manner.

According to one specific embodiment, the circuit carrier is connected to the carrier element by a form-locking and/or force-locking connection. The advantage of this is that the circuit carrier is generally connected to the carrier element in a technically simple and detachable manner. Moreover, it is normally possible to establish the connection quickly when producing the pressure sensor.

According to one specific embodiment, the circuit carrier is connected to the carrier element by a snap-in connection. The advantage of this is that the circuit carrier is normally connected to the carrier element in a technically particularly simple and cost-effective manner.

According to one specific embodiment, the carrier element is fastened in the housing element by a snap-in connection. It is advantageous in this regard that the carrier element is typically fastened in the housing element in a particularly secure and cost-effective manner.

According to one specific embodiment of the method, for connecting the control and/or evaluation circuit to ground, a grounding spring is inserted into a recess of the carrier element, in particular prior to connecting the circuit carrier to the carrier element. An advantage of this is that a connection to ground is established generally in a technically simple manner. Moreover, the grounding spring is typically situated in a manner that is technically simple and secured against loss.

According to one specific embodiment of the method, the control and/or evaluation circuit is disposed on two opposite sides of the circuit carrier. This typically makes it possible to produce a pressure sensor that is particularly compact or space-saving.

According to one specific embodiment of the method, the circuit carrier is connected to the carrier element by a snap-in connection and/or the carrier element is connected to the housing element by a snap-in connection. This generally produces particularly secure and technically simple connections between the different elements. A snap-in connection is typically particularly cost-effective. This normally lowers the production costs or the required production time.

It is pointed out that some of the possible features and advantages of the present invention are here described with reference to different specific embodiments of the pressure sensor or the method for producing a pressure sensor. One skilled in the art recognizes that the features may be suitably combined, adapted or exchanged in order to arrive at further specific embodiments of the present invention.

Specific embodiments of the present invention are described below with reference to the attached drawings, where neither the drawings nor the description are to be interpreted as limiting the invention.

The figures are only schematic and not drawn true to scale. Identical reference numerals designate the same or similarly acting features.

DETAILED DESCRIPTION

Figure 1:
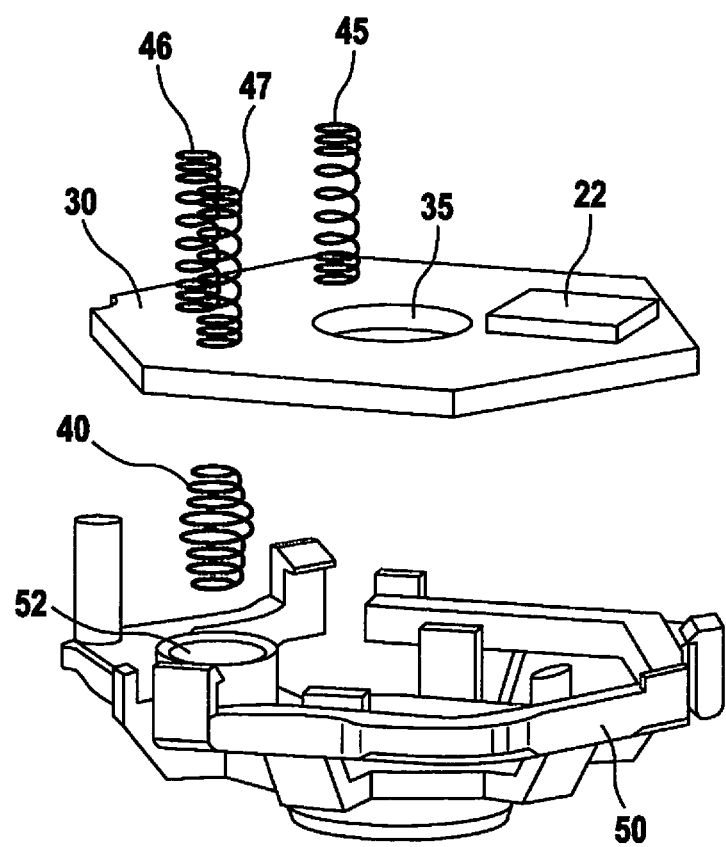
FIG. 1 shows a perspective view of a circuit carrier including a control and/or evaluation circuit and a carrier element of a specific embodiment of the pressure sensor of the invention prior to assembly.
Figure 2:
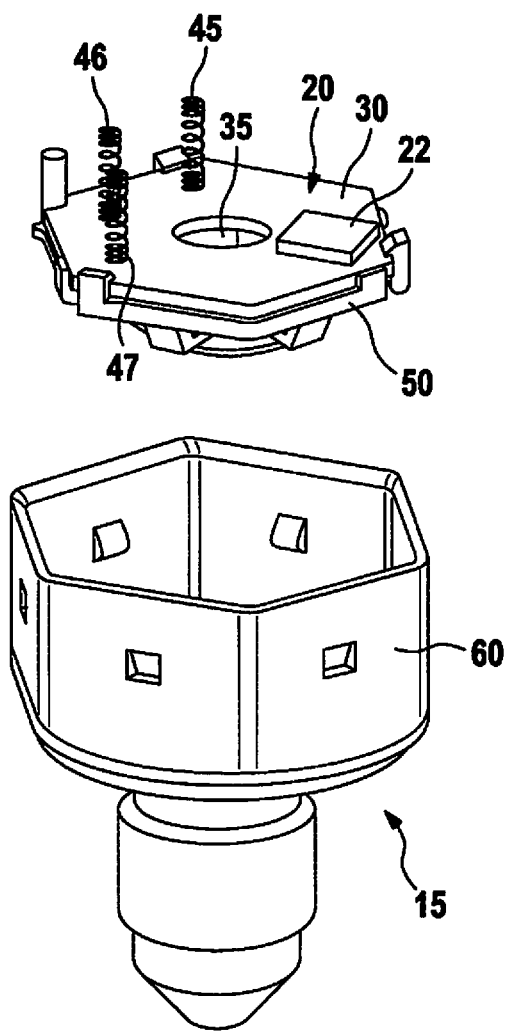
FIG. 2 shows the circuit carrier from FIG. 1, which has been connected to the carrier element from FIG. 1, and a lower housing element of the specific embodiment of the pressure sensor of the invention.
Figure 3:
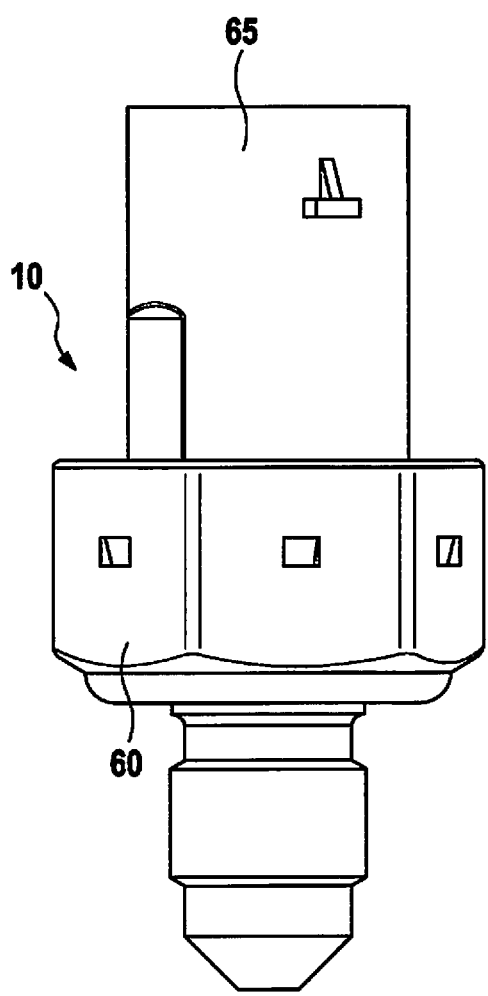
FIG. 3 shows a specific embodiment of the pressure sensor of the invention.
Figure 4:
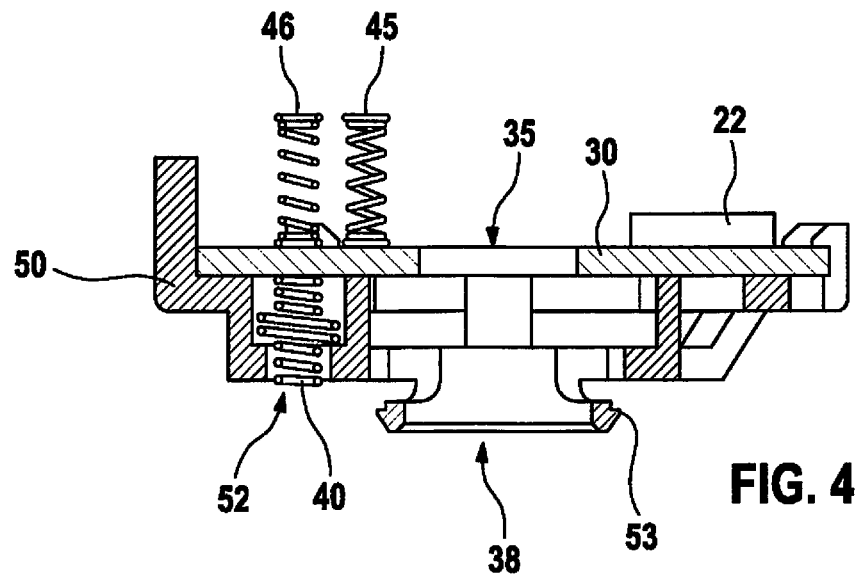
FIG. 4 shows a cross-sectional view of the circuit carrier, which has been connected to the carrier element, from FIG. 2.
Figure 5:
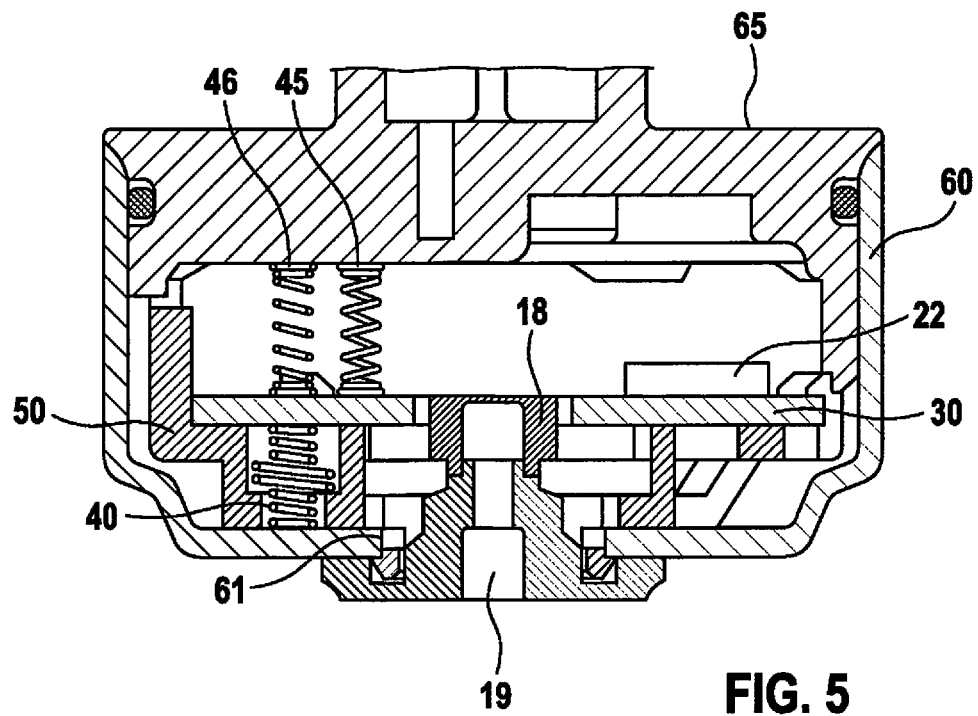
FIG. 5 shows a cross-sectional view of the pressure sensor from FIG. 3.

FIG. 1 shows a perspective view of a circuit carrier 30 including a control and/or evaluation circuit 20 and a carrier element 50 of a specific embodiment of the pressure sensor 10 of the invention prior to assembly. FIG. 2 shows the circuit carrier 30 from FIG. 1, which has been connected to the carrier element 50 from FIG. 1, and a lower housing element 60 of the specific embodiment of the pressure sensor 10 of the invention. FIG. 3 shows a specific embodiment of the pressure sensor 10 of the invention. FIG. 4 shows a cross-sectional view of the circuit carrier 30, which has been connected to the carrier element 50, from FIG. 2. FIG. 5 shows a cross-sectional view of the pressure sensor 10 from FIG. 3.

Pressure sensor 10 is configured to measure a pressure of a fluid, in particular of a liquid, such as e.g. oil. In particular, pressure sensor 10 is configured to measure high and very high pressures.

The pressure sensor comprises a pressure sensor base unit 15. Pressure sensor base unit 15 has a sensor element 18, in particular a pressure sensor element 18, for measuring the pressure of the fluid and a (lower) housing element 60. Sensor element 18 measures a pressure of a fluid in a pressure channel 19.

A control and/or evaluation circuit 20 for controlling and/or evaluating a measuring signal of sensor element 18 is likewise part of pressure sensor 10. Control and/or evaluation circuit 20 receives the measuring signal of sensor element 18 and processes or analyses the measuring signal in order to determine from it the pressure of the fluid. Control and/or evaluation circuit 20 normally comprises multiple semiconductor components 22. The drawings show only one semiconductor component 22 by way of example. Control and/or evaluation circuit 20 may have one or multiple semiconductor chips or integrated circuits. The circuit may comprise or may be a control circuit for controlling pressure sensor 18. Additionally or alternatively, the circuit may be an evaluation circuit 20 for evaluating the measuring signal of pressure sensor 18.

Control and/or evaluation circuit 20 is situated on a circuit carrier 30. Circuit carrier 30 may comprise e.g. a circuit board. Control and/or evaluation circuit 20 may be disposed or fastened on the two opposite sides of circuit carrier 30.

One or multiple connecting springs 45, 46, 47 are disposed on a first side (the upper side in FIG. 1) of circuit carrier 30. Connecting springs 45, 46, 47 are electrically connected to control and/or evaluation circuit 20. Connecting springs 45, 46, 47 electrically connect control and/or evaluation circuit 20 with further elements. The further elements may be part of pressure sensor 10 or may not be part of pressure sensor 10. The further elements may comprise e.g. a control unit, which takes certain measures on the basis of the determined pressure.

Circuit carrier 30 is connected to or fastened in a carrier element 50. The connection or fastening may be form-locking and/or friction-locking. In particular, the connection or fastening may be performed using one or multiple snap-in connection(s).

Carrier element 50 is made of one electrically non-conducting material or an electrically insulating material. This prevents short circuits. Carrier element 50 is configured in one piece. Carrier element 50 may be injection-molded or produced by deep drawing. The material of carrier element 50 may comprise e.g. plastic or may be plastic.

Carrier element 50 has a recess 52 for accommodating a grounding spring 40. Grounding spring 40 is located on a side of circuit carrier 30 facing away from connecting spring 45, 46, 47. Grounding spring 40 electrically connects a part of control and/or evaluation circuit 20 to ground and/or to housing element 60. Grounding spring 40 is optional. It is possible that no grounding spring 40 is installed. It is left out or not used in particular if no grounding or electrical connection of control and/or evaluation circuit 20 to ground or to lower housing element 60 is required.

The force-locking and/or form-locking connection makes it possible for circuit carrier 30 to be fitted with components on both sides. This makes it possible to reduce or minimize the volume that pressure sensor 10 or circuit carrier 30 with control and/or evaluation circuit 20 requires.

After fastening the circuit carrier 30 on carrier element 50, these interconnected elements (also called a circuit carrier assembly) are inserted into a lower housing element 60 of pressure sensor 10. FIG. 2 shows the state prior to this insertion into lower housing element 60.

Lower housing element 60 has a (regular) hexagonal shape, in particular inner shape. Circuit carrier 30 has a hexagonal shape. Carrier element 50 has a complementary hexagonal shape. Circuit carrier 30 is thereby aligned in a technically simple manner when inserted into carrier element 50. When inserting carrier element 50 into housing element 60, carrier element 50 together with circuit carrier 30 is also aligned in a technically simple manner.

Circuit carrier 30 has at its center a recess 35, in particular a circular recess. When inserting circuit carrier 30 into lower housing element 60, pressure sensor 10, which is situated above a pressure channel 19 for receiving the fluid to be measured, ends up in this recess 35. At the same time, an electrical connection can be established between pressure sensor 10 and control and/or evaluation circuit 20 by positioning circuit carrier 30 together with control and/or evaluation circuit 20 in lower housing element 60. For this purpose, pressure sensor 10 is able to contact or touch circuit carrier 30 in the area of recess 35 of circuit carrier 30.

Carrier element 50 has at its center an opening 38 in the form of a recess. When carrier element 50 is inserted into lower housing element 60, pressure sensor 10 and a portion of pressure channel 19 ends up in this opening 38.

Pressure sensor 10 may thus be very compact or volume-saving.

Carrier element 50 is fastened in lower housing element 60 by a force-locking and/or form-locking connection. In particular, the connection between carrier element 50 and lower housing element 60 may be a snap-in connection or clip-on connection.

For this purpose, lower housing element 60 has one or multiple projections 61 protruding toward the inside. Projection 61 may be circumferential. Alternatively, lower housing element 60 may have multiple projections 61 that are distributed evenly or unevenly around the circumference.

Carrier element 50 has one or multiple snap lugs 53 that are complementary to projection 61 or projections 61. Snap lug 53 may be configured circumferentially. Alternatively, there may be multiple snap lugs 53 distributed evenly or unevenly around the circumference.

Snap lug 53 or snap lugs 53 of carrier element 50 are snapped in or clipped on or pressed in below projection 61 or projections 61 of lower housing element 60. In this way, it is possible to achieve, in a technically simple, cost-effective and quick manner, a secure fastening of carrier element 50 and thus also of circuit carrier 30 together with control and/or evaluation circuit 20, circuit carrier 30 being securely connected to carrier element 50.

The snap-in connection or clip-on connection or press-fit connection may be configured to be detachable. In this manner, carrier element 50 together with circuit carrier 30 may again be removed from lower housing element 60 for exchange or examination.

Finally, an upper housing element 65 is connected to lower housing element 60. Now carrier element 50 together with circuit carrier 30 and control and/or evaluation circuit 20 is protected with respect to the surroundings or environment.

As may be seen clearly in the cross-sectional views of FIGS. 4 and 5, grounding spring 40 is situated between the lower side of circuit carrier 30 and lower housing element 60 in recess 52 of carrier element 50 in a manner that is secured against loss. At the same time, the position of carrier element 50 is securely determined in lower housing element 60 by grounding spring 40 and connecting spring 45, 46, 47.

Connecting springs 45, 46, 47 establish an electrical connection between the control and/or evaluation circuit 20 and a part situated in upper housing element 65. A technically simple electrical connection of control and/or evaluation circuit 20 is thus established.

Pressure sensor 10 may be assembled or connected in a technically simple manner and without tools or machines. In particular, no continuous material connection and no bonding is necessary in order to connect circuit carrier 30 to carrier element 50 or to connect carrier element 50 to lower housing element 60 of pressure sensor 10.

Finally, it is pointed out that terms such as "having," "comprising," etc. do not exclude other elements or steps and that term such as "one" or "a" do not exclude a plurality. Reference numerals in the claimed subject matter are not to be regarded as restrictions.

What is claimed is:

1. A pressure sensor for measuring a pressure of a fluid, comprising:
   a sensor element for measuring the pressure of the fluid;
   a control and/or evaluation circuit for controlling and/or evaluating a measuring signal of the sensor element;
   a circuit carrier, wherein the control and/or evaluation circuit is situated on the circuit carrier;
   a carrier element, wherein the circuit carrier is fastened on the carrier element;
   a housing element, wherein the carrier element together with the circuit carrier is fastened in the housing element in a form-locking and/or force-locking manner;
   at least one connecting spring disposed on an upper side of the circuit carrier, and for electrically connecting the control and/or evaluation circuit to further elements; and
   a grounding spring for connecting the control and/or evaluation circuit to ground, the grounding spring being located on a lower side of the circuit carrier facing away from the at least one connecting spring;
   wherein the carrier element has a recess for accommodating the grounding spring,
   wherein the housing element includes a lower housing element and an upper housing element, which are connectable together,
   wherein the fastened circuit carrier and carrier element are inserted into the lower housing element,
   wherein the circuit carrier, the carrier element, and the lower housing element have a complementary shape, so that the circuit carrier is aligned when inserted into the carrier element, and wherein the carrier element and the circuit carrier are aligned when inserted into the lower housing element,
   wherein the carrier element is fastened in the lower housing element by a snap-in or clip-on connection, wherein for this purpose, the lower housing element has one or multiple projections protruding toward the inside,
   wherein the carrier element has one or multiple snap lugs complementary to the projections, and
   wherein the carrier element is configured in one piece from an electrically non-conducting material.

2. The pressure sensor of claim 1, wherein the control and/or evaluation circuit is situated on two opposite sides of the circuit carrier.

3. The pressure sensor of claim 1, wherein the circuit carrier is connected to the carrier element by a form-locking and/or force-locking connection.

4. The pressure sensor of claim 3, wherein the circuit carrier is connected to the carrier element by a snap-in connection.

5. A method for producing a pressure sensor for measuring a pressure of a fluid, the method comprising:
- providing a pressure sensor base unit, the pressure sensor base unit including a housing element and a sensor element for measuring the pressure of the fluid;
- providing a circuit carrier including a control and/or evaluation circuit for controlling and/or evaluating a measuring signal of the sensor element,
- connecting the circuit carrier to a carrier element, which is formed in one piece from an electrically non-conducting material, by a form-locking and/or a force-locking connection;
- inserting the carrier element together with the circuit carrier into the housing element and connecting the carrier element to the housing element;
- disposing at least one connecting spring disposed on an upper side of the circuit carrier, and for electrically connecting the control and/or evaluation circuit to further elements; and
- providing a grounding spring for connecting the control and/or evaluation circuit to ground, the grounding spring being located on a lower side of the circuit carrier facing away from the at least one connecting spring;
- wherein the carrier element has a recess for accommodating the grounding spring,
- wherein the housing element includes a lower housing element and an upper housing element, which are connected together,
- wherein the fastened circuit carrier and carrier element are inserted into the lower housing element,
- wherein the circuit carrier, the carrier element, and the lower housing element have a complementary shape, so that the circuit carrier is aligned when inserted into the carrier element, and wherein the carrier element and the circuit carrier are aligned when inserted into the lower housing element,
- wherein the carrier element is fastened in the lower housing element by a snap-in or clip-on connection, wherein for this purpose, the lower housing element has one or multiple projections protruding toward the inside, and
- wherein the carrier element has one or multiple snap lugs complementary to the projections.

6. The method of claim 5, wherein, for connecting the control and/or evaluation circuit to ground, a grounding spring is inserted into a recess of the carrier element, in particular before the circuit carrier is connected to the carrier element.

* * * * *